UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ALUMINOUS COMPOSITION AND METHOD OF MAKING THE SAME.

1,339,344.     Specification of Letters Patent.     Patented May 4, 1920.

No Drawing.     Application filed September 18, 1919. Serial No. 324,553.

*To all whom it may concern:*

Be it known that I, OTIS HUTCHINS, a citizen of the United States, residing at Niagara Falls, Niagara county, New York, have invented a new and useful Improvement in Aluminous Compositions and Methods of Making the Same, of which the following is a full, clear, and exact description.

This invention relates to an improved aluminous composition or abrasive and to the method of making the same.

When abrasives are used in conjunction with an adhesive, such as glue, for abrasive purposes, in the form of an abrasive paper, cloth or buffing wheel, the efficiency of the abrasive depends largely upon the amount of adhesion between the grain and the glue. The amount of adhesion obtained is a function of the roughness of the surface of the abrasive. Artificial aluminous abrasives have normally a very smooth surface, and consequently, when used in conjunction with glue, do not exhibit this property of adhesion to the extent of certain abrasives having rough surfaces, such as natural emery.

Practically all commercial aluminous abrasives have an alumina content of 92 to 98%, the remainder being oxids of titanium, silicon, iron, calcium and magnesium. The alumina for the most part appears in the form of alumina crystals, the other oxids present forming a glass which acts as a matrix holding the alumina crystals together. The size of these alumina crystals within the abrasive has an important bearing on the roughness of the surface of the abrasive grain. When these crystals are comparatively large, the surface of the abrasive grain will be comparatively smooth, as any surface area will consist of a fracture of one or at most of a very few alumina crystals. However, when the alumina crystals are comparatively small (very much smaller than the abrasive grains in question), the surface will be comparatively rough, as it will be composed of the surfaces of a large number of small crystals not in the same plane. A rough surface of this character is well exemplified by natural emery where the alumina crystals are exceedingly minute. The average size of the alumina crystals in ordinary artificial aluminous abrasives is about .5 m. m., and abrasive grains made from this material will have comparatively smooth surfaces.

I have discovered that an aluminous abrasive in which the alumina crystals are very small and which, when crushed, furnishes abrasive grains having exceedingly rough surfaces can be produced by the introduction of strontium oxid into aluminous fusions such as are now used for the manufacture of abrasives. The strontium oxid apparently combines with some of the impurities present in the melt and crystallizes in long needle-shaped crystals. These long crystals are uniformly distributed throughout the crystallized alumina, breaking up into a large number of small alumina crystals, a crystal growth which would otherwise have formed a large crystal.

The ultimate result is the formation of an abrasive in which the alumina crystals are very small and these crystals are, in turn, surrounded by others very much smaller which contain the strontium oxid.

In the preferred method of carrying out my invention, I have fused in an electric furnace the following mixture:

300 parts aluminous waste, 170 parts calcined bauxite, 30 parts strontium carbonate.

The aluminous waste analyzed as follows:

| | |
|---|---:|
| $SiO_2$ | 1.38 |
| $FeO$ | .91 |
| $TiO_2$ | 3.90 |
| $Al_2O_3$ | 93.06 |
| | 99.25 |

The calcined bauxite analyzed as follows:

| | |
|---|---:|
| $SiO_2$ | 8.90 |
| $Fe_2O_3$ | 9.50 |
| $TiO_2$ | 4.60 |
| $Al_2O_3$ | 76.50 |
| | 99.50 |

The strontium carbonate was the usual commercial grade.

The product from this fusion was dense, of very rough fracture, and analyzed as follows:

| | |
|---|---|
| $SiO_2$ | .24 |
| $FeO$ | .12 |
| $TiO_2$ | 2.68 |
| $SeO$ | 3.62 |
| $Al_2O_3$ | 92.81 |
| | 99.47 |

The materials were fused by the usual electric furnace process, such for example, as that described in the Tone patent, No. 1,002,608, of September 5, 1911.

During the fusion, there was a certain amount of reduction of the iron oxid, titanium oxid and silica, due to carbon from the furnace lining and electrodes.

In the practice of my invention, I do not limit myself to the particular raw materials mentioned. I may use for the source of the alumina, bauxite, clay, emery, aluminous waste or other suitable material high in alumina. These materials may be used as a mixture or singly. As a source of the strontium oxid, I may use strontium carbonate, strontium sulfate or other suitable strontium compound which, upon calcination, yields strontium oxid. When necessary, I may use carbon in the mixture fused to produce a product of the desired purity.

I claim:

1. A crystalline aluminous product containing strontium oxid, substantially as described.

2. An aluminous abrasive containing oxids of iron, silicon, titanium and strontium, substantially as described.

3. An aluminous abrasive consisting of alumina crystals surrounded by smaller crystals which contain strontium oxid, substantially as described.

4. An aluminous abrasive containing oxids of silicon, titanium and strontium, substantially as described.

5. The method of making an aluminous abrasive which consists in fusing in an electric furnace a mixture containing an aluminous material and a strontium compound which upon such furnace fusion yields strontium oxid, substantially as described.

6. The method of making an aluminous abrasive which consists in fusing in an electric furnace a mixture containing an aluminous material containing minor quantities of silicon, iron and titanium oxids, and a strontium compound which upon such furnace fusion yields strontium oxid, and supplying carbon in sufficient quantity to reduce the major portion of the silicon, iron and titanium oxids, but insufficient to reduce the strontium oxid, substantially as described.

7. The method of making an aluminous abrasive which consists in fusing a mixture containing an aluminous material and a strontium compound which leaves a strontium oxid in the product, substantially as described.

In testimony whereof I have hereunto set my hand.

OTIS HUTCHINS.